(12) United States Patent
Kono

(10) Patent No.: US 6,958,830 B2
(45) Date of Patent: Oct. 25, 2005

(54) IMAGE READING APPARATUS

(75) Inventor: Takanobu Kono, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 911 days.

(21) Appl. No.: 09/981,826

(22) Filed: Oct. 19, 2001

(65) Prior Publication Data

US 2002/0057472 A1    May 16, 2002

(30) Foreign Application Priority Data

Oct. 23, 2000    (JP) ............................. 2000-322484

(51) Int. Cl.[7] ............................. H04N 1/04; H04N 1/40
(52) U.S. Cl. ..................................... 358/443; 358/471
(58) Field of Search ........ 358/443, 471; 713/500–503; 347/255

(56) References Cited

U.S. PATENT DOCUMENTS 6,147,699 A * 11/2000 Berry et al. ................. 347/255

6,493,830 B2 * 12/2002 Kamei ......................... 713/501

FOREIGN PATENT DOCUMENTS

| JP | B2 3152544 | 1/1995 |
|----|------------|--------|
| JP | A 11-46302 | 2/1999 |
| JP | A 11-187223 | 7/1999 |
| JP | A 2000-32189 | 1/2000 |
| JP | A 2000-32190 | 1/2000 |

* cited by examiner

Primary Examiner—Scott Rogers
Assistant Examiner—Charlotte M. Baker
(74) Attorney, Agent, or Firm—Oliff & Berridge, PLC

(57) ABSTRACT

In a flat bed type scanner, while a control unit (24) for generating a secondary control signal and for controlling a CCD (22) is separated from an image processing ASIC (46) for generating a primary clock signal as a base signal of the secondary control signal, this scanner is arranged so as to generate the secondary control signal having the short pulse width from the primary clock signal having the long pulse width. This scanner employs such an arrangement that the primary clock signal having the long pulse width is transmitted via an FFC (40) which electrically connects the image processing ASIC (46) with the control unit (24).

6 Claims, 4 Drawing Sheets

IMAGE READING APPARATUS

BACKGROUND OF THE INVENTION

The present invention is related to a system for mounting a control circuit in an image reading apparatus.

Generally, image reading apparatus such as image scanners and facsimile machines are known as input apparatus of digital images. Since computers require high performance, image reading apparatus require high-speed performance. For instance, image reading apparatus may be operated in high speeds in such a manner that widths of control signals, such as a shift pulse and a reset pulse used to control CCDs (charge-coupled devices) which is widely employed as elements for converting optical information into electronic information, are set to short pulse widths of high-frequency control signals, and widths of sampling signals for A/D converters are set to short pulse widths of high-frequency sampling signals.

FIG. 5 shows a related flat bed type image scanner, in which both a CCD 22 and an A/D converter 25 are provided in a carriage 20, an image processing ASIC 52 including a control circuit 51 is provided in a case 11 for supporting the carriage 20, and the control circuit 51 generates a control signal used for the CCD 22 and a sampling signal used for the A/D converter 25. The image processing ASIC 52, the CCD 22, and the A/D converter 25 are connected to each other by employing a flexible flat cable 53 (will be referred to as an "FFC" hereinafter) having a length of several tens cm. That is, in the related flat bed type image scanner, the transmission path for the above-explained control signals and the like is very long. As a result, although an EMI (ElectroMagnetic Interference) measure should be sufficiently introduced in the vicinity of the FFC 53, due to the long length of the transmission path, distortion of waveforms of signal occurs and timing of the signal delays. In addition, the distortion of waveforms of signals occurs and timing of the signal delays due to the employment of such an EMI measure which employs a filter, a resistor, etc. To prevent these drawbacks, high cost components are necessary for the EMI measure. Therefore, this EMI measure may conduct cost-up matters of final products.

Furthermore, when the related flat bed type scanner is operated in a high speed by generating a clock signal having a higher frequency, or a pulse signal having a shorter pulse width, there is such a problem that since distortion of waveforms of signal occurs and timing of the signal delays due to an EMI filter and a resistor, frequencies of signals cannot be set to considerably high frequencies. Accordingly, in such a related flat bed type image scanner, both the width of the control signal for the CCD 22 and the pulse width of the sampling signal for the A/D converter 25 are set to be on the order of 40 nsec. In image reading apparatus such as flat bed type image scanners, both EMI measures and also lengths of signal transmission paths may constitute barriers for high-speed operations thereof in view of mounting techniques.

SUMMARY OF THE INVENTION

The present invention has been made to solve such a problem, and therefore, has an object to provide an image reading apparatus capable of reducing EMI noise and also capable of increasing a reading speed thereof.

In order to solve the aforesaid object, the invention is characterized by having the following arrangement.

(1) An image reading apparatus comprising:
an image input unit for generating an analog image signal corresponding to optical density information of an original;
an A/D converter for converting the analog image signal inputted from the image input unit into a digital image signal;
an image processor for generating a primary control signal and for executing an image process operating based on the digital image signal inputted from the A/D converter;
a controller for generating a secondary control signal from the primary control signal for controlling the image input unit based on the generated secondary control signal, a pulse width of the secondary control signal being shorter than a pulse width of the primary signal; and
a wiring member for electrically connecting the image processor to the controller for transmitting the primary control signal therethrough.

(2) The image reading apparatus according to (1), wherein the image input unit and the controller are provided in a carriage which is reciprocated in parallel to a surface of the original, and
the image processor is provided in a case which supporting the carriage so as to allow the reciprocation motion of the carriage.

(3) The image reading apparatus according to (2), wherein the controller generates a sampling signal in synchronism with the secondary control signal from the primary control signal,
the A/D converter is provided in the carriage and converts the analog image signal into the digital image signal by using the sampling signal, and
the wiring member transmits the digital image signal.

(4) The image reading apparatus according to (1), wherein the controller includes a PLL circuit.

(5) The image reading apparatus according to (2), wherein the wiring member has flexibility for allowing the reciprocation motion of the carriage.

(6) The image reading apparatus according to (1), wherein frequency of the secondary control signal is multiple of frequency of the primary control signal.

In accordance with an image reading apparatus of the present invention, since the primary control signal having the long pulse width is transmitted via a wiring member for electrically connecting the image processor to the controller, EMI noise of the image reading apparatus can be reduced and image reading speed thereof can be increased. In other words, since the primary control signal has the long pulse width and can be set so that the rising/falling pulse portions thereof is made be gentle, the length of the wiring member for transmitting the primary control signal can be prolonged, and the length of the wiring member for transmitting the secondary control signal having the short pulse width can be shortened. Therefore, the rising/falling pulse portions of the secondary control signal can be made steep, the EMI noise can be reduced and the image reading speed can be increased.

Since the wiring member is employed so as to connect the image input unit provided in the carriage to the image processor provided in the case, the total length of this wiring member is normally equal to several tens cm. According to the present invention, since the wiring member transmits such a primary control signal having a longer pulse width than the pulse width of the secondary control signal, the EMI noise can be reduced and the image reading speed can be increased. Further, since the image processor is provided in the case, the image processor having the large dimension can be easily mounted.

Further according to the present invention, the analog image signal is not transmitted via such a long wiring path which is employed so as to connect the A/D converter provided in the carriage to the image processor provided in the case. As a consequence, it is possible to reduce noise which is mixed into the signal for transmitting the image information. Further, according to the present invention, since the controller is so arranged as to generate the sampling signal from the primary control signal and this sampling signal is synchronized with the secondary control signal, the sampling signal having the short pulse width which is required by the A/D converter is no longer transmitted via the long wiring path. As a result, the EMI noise can be reduced and the reading speed can be increased.

The present disclosure relates to the subject matter contained in Japanese patent application No.2000-322484 (filed on Oct. 23, 2000), which is expressly incorporated herein by reference in its entirety.

DETAILED DESCRIPTION OF PREFERRED EMBODIMENTS

Figure 1:
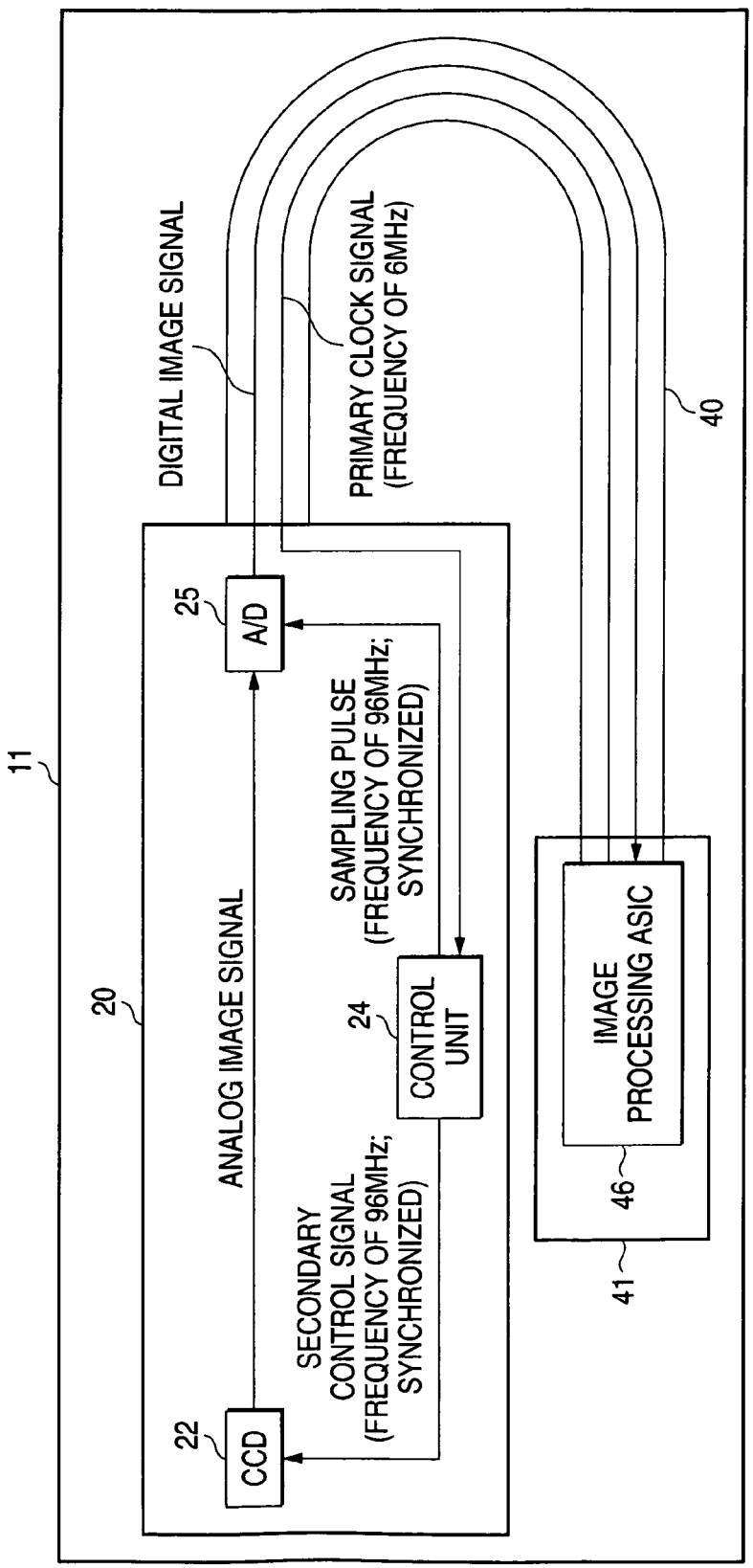
FIG. 1 is a schematic diagram for indicating a signal transmission path of a scanner according to an embodiment of the present invention.
Figure 2:
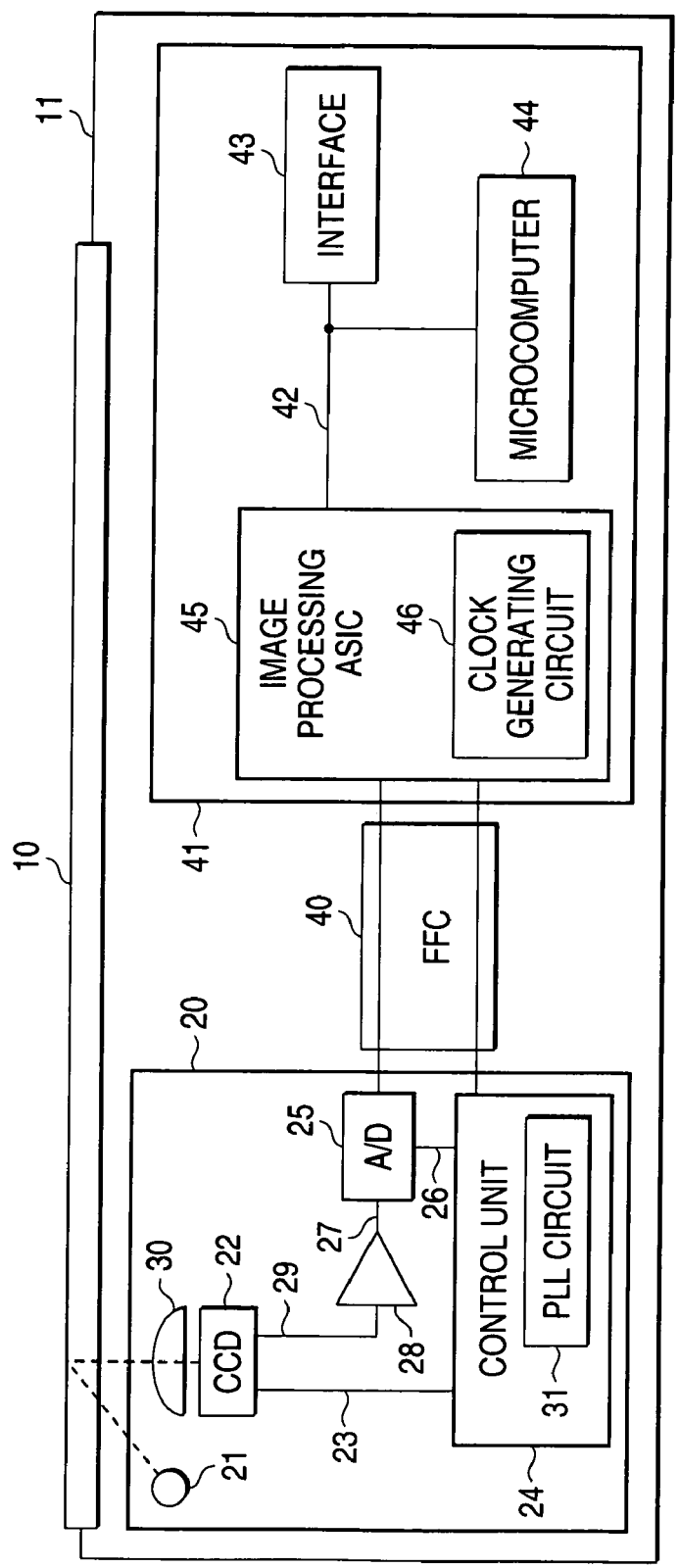
FIG. 2 is a block diagram for showing the scanner according to one embodiment of the present invention.

A scanner as an image reading apparatus according to an embodiment of the present invention is shown in FIG. 1 and FIG. 2. The scanner in this embodiment is a flat bed type scanner provided with a carriage 20 which is reciprocated in a parallel manner with respect to a plane of an original.

An original glass plate 10 is provided on an upper surface of a box type case 11. An original guide (now shown) for positioning an original is provided at a peripheral portion of the original glass plate 10. A white reference (not shown) having a uniform reflection surface of a high reflectance is provided at an edge portion of the original glass plate 10. The carriage 20 is supported by a guide rod (not shown) which is fixed to the box type case 11 in a reciprocatable manner. The drive belt (not shown) is fixed on the carriage 20, and is rotated by a drive apparatus (not shown) A lamp 21 is installed in the carriage 20, and is constituted by a rod-shaped fluorescent lamp or the like, and illuminates an original mounted on the original glass plate 10. An optical system 30 functioning as an image input unit is arranged by a plurality of mirrors and a plurality of lenses. This optical system 30 forms an optical path defined from a surface of an original to a CCD line sensor 22.

The CCD line sensor 22 functioning as an image input unit stores a certain amount of electron charges according to an amount of light received by each of light receiving elements of the CCD line sensor. This CCD line sensor 22 outputs the stored electron charges to an amplifier 28 in response to a secondary control signals such as a shift pulse and the like, which are inputted from a control unit 24. Incidentally, a CCD capable of outputting a color signal may be employed as the CCD line sensor 22. The CCD line sensor 22 is constituted by employing large numbers of photoelectric converting elements, of transmission gates, of analog shift registers, of charge voltage converting units, and the like. The electron charges stored in the photoelectric converting elements are transmitted to the analog shift registers in response to the shift pulses entered into the transmission gates. By changing interval of the shift pulse, a time duration in which the electron charges are stored into the photoelectric converting elements can be changed. The transmission of the electron charges from the photoelectric converting elements to the analog shift registers is carried out at the same time as to all of the photoelectric converting elements. The electron charges transmitted to the analog shift registers are sequentially transmitted to the charge voltage converting units in response to a secondary clock signal so as to be converted into voltages. This voltage is inputted as an analog image signal into the amplifier 28. An interval of a shift pulse, namely charge storage time of a photoelectric converting element, is controlled based upon a computer program installed in a microcomputer 44. The amplifier 28 amplifies the analog image signal entered from the CCD line sensor 22, and then, outputs the amplified image signal to an A/D converter 25. The A/D converter 25 samples the analog image signal entered from the amplifier 28 for outputting a digital image signal having 256 gradations. The A/D converter 25 samples the analog image signal by using a sampling pulse entered from the control unit 24.

The control unit 24 functioning as a controller generates a secondary clock pulse having a frequency of 96 MHz, and generates, from the secondary clock pulse, a shift pulse, a reset pulse, and a sampling pulse as a sampling signal. Then, the control unit 24 outputs the secondary control signal to the CCD line sensor 22, and outputs the sampling pulse to the A/D converter 25. The secondary clock pulse of 96 MHz may be generated by employing a PLL circuit 31 contained in the control unit 24 in such a manner that a frequency of a primary clock pulse inputted into the control unit 24 is multiplied by 16. It should be noted that the frequency of the secondary clock pulse is not limited to 96 MHz, but may be arbitrarily determined in accordance with performance of the CCD lines sensor 22 and also performance of the A/D converter 25, More increasing the frequency of the secondary clock pulse, the shorter the pulse width of the second control signal and the pulse width of the sampling pulse can be generated. More shortening the pulse width of the secondary control signal and the pulse width of the sampling pulse, the higher the operation speed of the CCD line sensor 22 and the A/D converter 25 can be carried out. These signals generated by the control unit 24 are transmitted via 5 pieces of signal lines 23 to the CCD line sensor 22, and are transmitted via 4 pieces of signal lines 26 to the A/D converter 25. As described above, the control unit 24 can operate both the CCD line sensor 22 and the A/D converter 25 in high speeds by multiplying the frequency of the primary clock pulse.

A data line having an 8-bit width and a clock signal line and the like are provided with an FFC (flexible flat cable) 40. The data line is for transmitting an 8-bit digital image signal outputted from the A/D converter 25 to an image processing ASIC 45. In the case that output signals of the CCD line sensor 22 are color signals, R (red) G (green), and B (blue) image signals are transmitted to the image processing ASIC 45 in a time division manner. The clock signal line is for transmitting the primary clock pulse outputted from the image processing ASIC 45 to the control unit 24. End portions of the FFC 40 are connected to a connector (not shown) provided at the carriage 20, and to another connector (not shown) provided on a main board 41, respectively. The FFC 40 has a sufficiently large flexure in order that the carriage 20 may be reciprocated over such a distance of approximately 30 cm in parallel to the original glass plate 10.

The main board 41 is fixed on the case 11. The image processing ASIC 45, an interface unit 43, a microcomputer 44, and the like, which are connected each other through a bus 42, are mounted on the main board 41.

The image processing ASIC 45 functioning as an image processor compares white reference data, obtained by the white reference before reading, with black reference data previously stored so as to correct dispersion in sensitivity with the photoelectric converting elements of the CCD line sensor 22, and so as to correct dispersion in light amounts of the lamp 21 along the main scanning direction. Then, the image processing ASIC 45 executes various converting operations such as a gamma correction and a color correction. The image processing ASIC 45 contains a clock generating circuit 46. The clock generating circuit 46 generates a primary clock pulse having a frequency of 6 MHz as the primary control signal, and then, outputs this generated primary clock pulse to the control unit 24.

The interface unit 43 constitutes such an interface used to connect a host computer (not shown) to a scanner. The microcomputer 44 is provided with CPU, RAM, ROM, and so on. This microcomputer 44 controls an overall operation unit of this scanner such as the image processing ASIC 45, the interface unit 43, the control unit 24, and the like.

The arrangement of the scanner according to the embodiment of the present invention has been explained. Now, operations of this scanner will be described. When the microcomputer 44 receives a reading start command from the host computer (not shown), this microcomputer 44 operates the scanner as following by executing a predetermined program.

Figure 3:
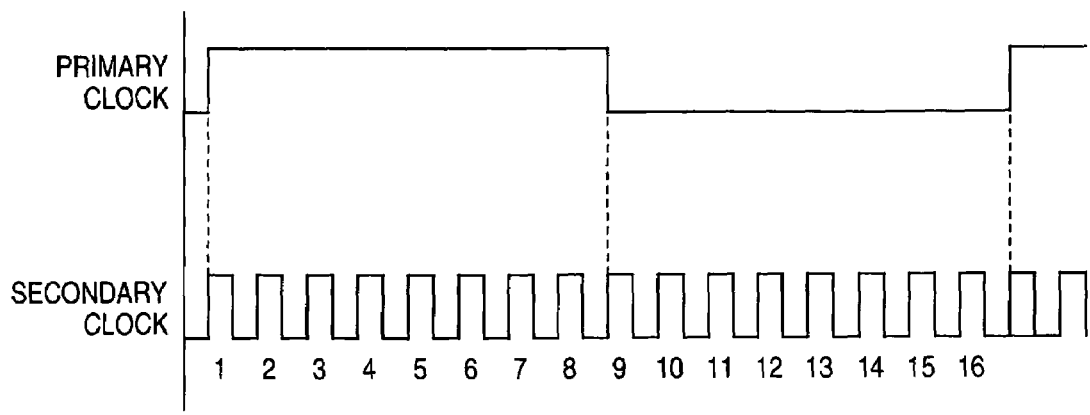
FIG. 3 is a timing chart for describing both a primary clock pulse and a secondary clock pulse.
Figure 4:
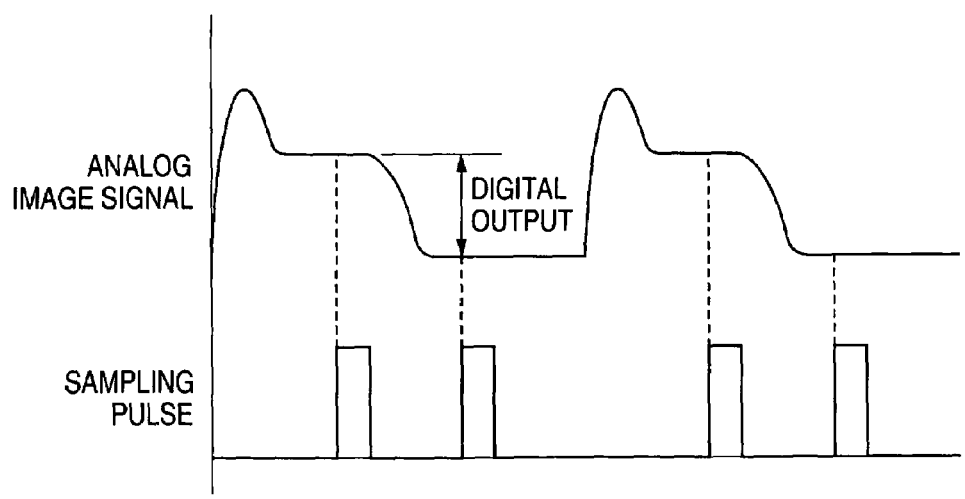
FIG. 4 is a schematic diagram for explaining sampling operation of an A/D converter.

Under control of the microcomputer 44, the lamp 21 is turned ON and the white reference data is obtained. Thereafter, the carriage 20 is moved to a position corresponding to a reading origin by a drive apparatus (not shown) under control of the microcomputer 44. An original mounted on the original glass plate 10 is imaged on the CCD line sensor 22 by the optical system 30. The control unit 24 generates the secondary clock pulse having the frequency of 96 MHz from the primary clock pulse having the frequency of 6 MHz which is outputted by the image processing ASIC 45, and generates the secondary control signal such as the shift pulse based upon this secondary clock pulse so as to control the CCD line sensor 22 based on the secondary control signal. The pulse width of the secondary control signal becomes shorter, operating speed of the CCD line sensor 22 can become higher. FIG. 3 is a timing chart showing the primary clock pulse and the secondary clock pulse. The electron charges are derived from the CCD line sensor 22 at such a timing in synchronism with the shift pulse, and then, the derived electron charges are inputted as the analog image signal to the amplifier 28. The CCD line sensor 22 releases the electron charges every one line. When the CCD line sensor 22 has released the electron charges corresponding to one line, the drive apparatus moves the carriage 20 to a next reading line. The analog image signal amplified by the amplifier 28 is sampled by the A/D converter 25 in response to the sampling pulse entered from the control unit 24 so as to be converted into the 8-bit digital image signal. As shown in FIG. 4, the A/D converter 25 samples two points of a single analog output waveform by employing a sampling pulse generated from the secondary clock pulse having the frequency of 96 MHz, and outputs voltage differences thereof as the 8-bit digital image signal. The pulse width of the sampling pulse may become narrower, the sampling period of the A/D converter, for sampling the analog image signal outputted from the CCD line sensor 22, may become shorter. The digital image signal is transmitted via the FFC 40 to the image processing ASIC 45. The image data which is generated by performing the shading correction and the gamma correction by the image processing ASIC 45 is outputted via the interface unit 43 to the host computer.

In the above-described operations of the scanner, the below-mentioned signal transmission operations are carried out within the FFC 40 and the carriage 20. The FFC 40 transmits both the primary clock pulse having the frequency of 6 MHz, and the digital image signal. A signal line 26 connecting the control unit 24 with the A/D converter 25 transmits the sampling pulse and the like generated from the secondary clock pulse having the frequency of 96 MHz. Another signal line 23 connecting the control unit 24 with the CCD line sensor 22 transmits the secondary control signal such as the shift pulse and the reset pulse generated from the secondary clock pulse having the frequency of 96 MHz. A signal line 27 and a signal line 29, which are employed so as to connect the CCD line sensor 22 with the A/D converter 25, transmit the analog image signal.

Since the signal transmission paths of the signal lines 28 and 27 are shorter than the signal transmission path of the FFC 40, a small amount (non-considerable amount) of noise is mixed into signals transmitted via these signal lines 23 and 27, and distortion of signal waveforms is low, as compared with those of the FFC 40. As a consequence, the analog image signal outputted from the CCD line sensor 22 may be correctly converted into the digital image signal. Also, since the signal transmission paths of the signal lines 23 and 26 are shorter than the signal transmission path of the FFC 40, when such a secondary control signal, the pulse width of which is narrow and the rising/falling pulse portions of which are steep, is transmitted by the signal lines 23 and 26, these signal lines 23 and 26 can hardly generates EMI noise, as compared with the FFC 40. Since the EMI noise can be hardly generated, both the CCD line sensor 22 and the A/D converter 25 can be controlled by employing such a secondary control signal and such a sampling pulse, the pulse widths of which are narrow, and the rising/falling pulse portions of which are steep.

In other words, in accordance with this embodiment, by transmitting the primary clock signal having the lower frequency through the FFC 40, and controlling the CCD line sensor 22 and the A/D converter 25 by the signal generated in response to the secondary clock signal having the high frequency generated from the primary clock signal, the EMI noise can be reduced and the reading speed can be increased. Further, in accordance with the scanner of this embodiment, since the image processing ASIC 45 is provided on the main board 41 fixed to the case 11, the image processing ASIC 45 having the large dimension can be mounted.

COMPARISON EXAMPLE

Figure 5:
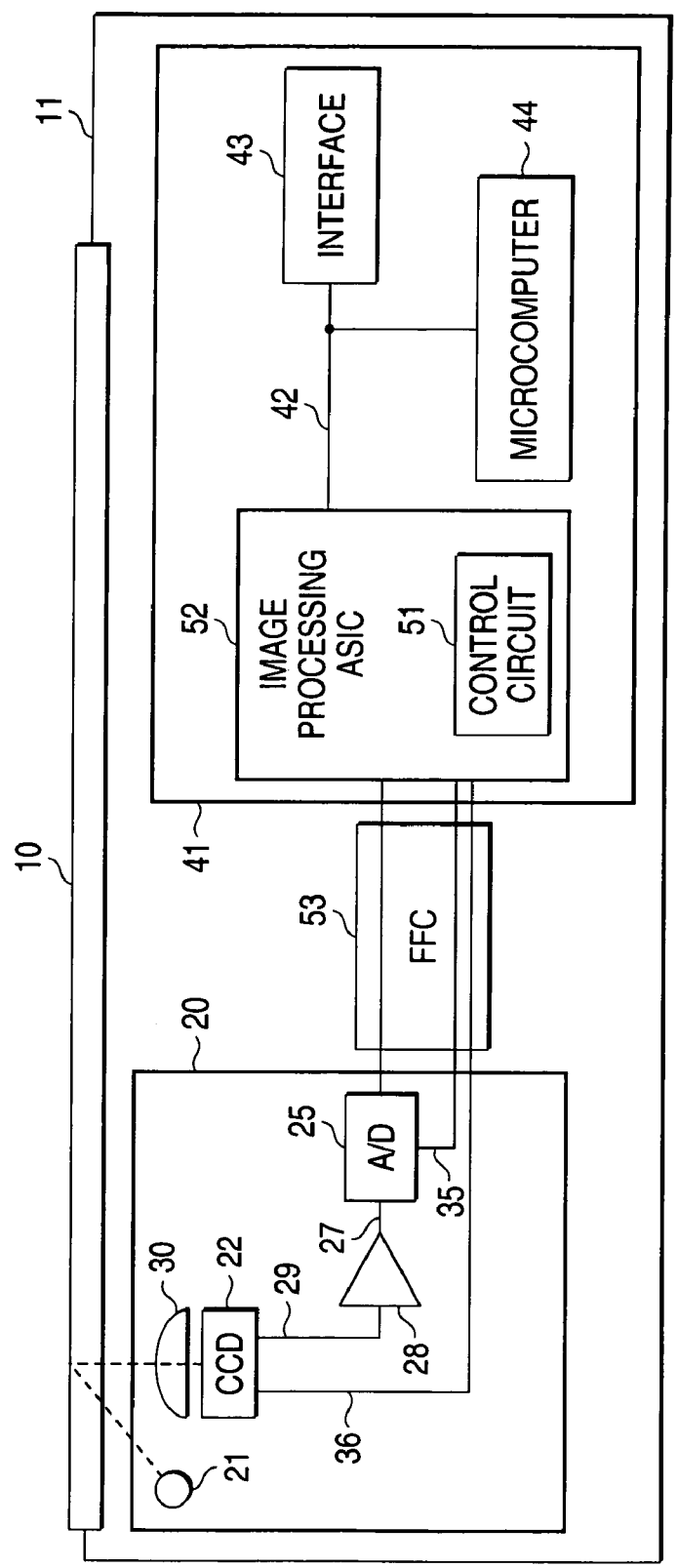
FIG. 5 is a schematic block diagram for showing the scanner as a comparison example.

FIG. 5 shows a related scanner as a comparison example of the above-described embodiment. In FIG. 5, the same reference numerals shown in the scanner related to above-described embodiment will be employed as those for indicating the essentially same structural elements of this comparison example. An image processing ASIC 52 contains a control circuit 51 which outputs such control signals for controlling both the CCD line sensor 22 and the A/D converter 25. The control signals outputted from the control circuit 51 are transmitted via an FFC 53 to the CCD line sensor 22 and the A/D converter 25.

In accordance with the related scanner as shown in FIG. 5, since the control signals for the CCD line sensor 22 and the A/D converter 25 are generated on the side of the main board, in such a case that the operation frequencies of both the CCD line sensor 22 and the A/D converter 25 are increased so as to operate these CCD line sensor 22 and A/D converter 25 in higher speeds, the pulse widths of the control signals which are transmitted by the FFC 53 are made narrow, and the rising portions and the falling portions of the pulses may become steep. Further, since the control signals for the CCD line sensor 22 and the A/D converter 25 are generated on the side of the main board, and the FFC 53 transmits all of these control signals over long distances, the EMI measure should be sufficiently applied to the FFC 53 in order to increase the operation frequency of this conventional scanner. Since the pulse width of the reset pulse of the CCD line sensor 22 is shorter than the pulse width of another control signal, the EMI measure is especially required with respect to this reset pulse. However, the signal waveform is distorted and the timing is delayed due to unavoidable adverse secondary effects of the EMI measure, so that it is practical difficult to transmit such a pulse having an excessively short pulse width. Therefore, there is a practical limitation in increasing of operations of the conventional scanner.

What is claimed is:

1. An image reading apparatus comprising:
    an image input unit for generating an analog image signal corresponding to optical density information of an original;
    an A/D converter for converting the analog image signal inputted from the image input unit into a digital image signal;
    an image processor for generating a primary control signal and for executing an image process operating based on the digital image signal inputted from the A/D converter;
    a controller for generating a secondary control signal from the primary control signal for controlling the image input unit based on the generated secondary control signal, a pulse width of the secondary control signal being shorter than a pulse width of the primary signal; and
    a wiring member for electrically connecting the image processor to the controller for transmitting the primary control signal therethrough.

2. The image reading apparatus according to claim 1, wherein
    the image input unit and the controller are provided in a carriage which is reciprocated in parallel to a surface of the original, and
    the image processor is provided in a case which supporting the carriage so as to allow the reciprocation motion of the carriage.

3. The image reading apparatus according to claim 2, wherein
    the controller generates a sampling signal in synchronism with the secondary control signal from the primary control signal,
    the A/D converter is provided in the carriage and converts the analog image signal into the digital image signal by using the sampling signal, and
    the wiring member transmits the digital image signal.

4. The image reading apparatus according to claim 1, wherein the controller includes a PLL circuit.

5. The image reading apparatus according to claim 2, wherein the wiring member has flexibility for allowing the reciprocation motion of the carriage.

6. The image reading apparatus according to claim 1, wherein frequency of the secondary control signal is multiple of frequency of the primary control signal.

* * * * *